US012780537B2

(12) United States Patent
Sato

(10) Patent No.: US 12,780,537 B2
(45) Date of Patent: Nov. 3, 2026

(54) CEILING STORAGE RACK AND CONVEYANCE SYSTEM

(71) Applicant: DAIFUKU CO., LTD., Osaka (JP)

(72) Inventor: Masaru Sato, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 332 days.

(21) Appl. No.: 18/404,095

(22) Filed: Jan. 4, 2024

(65) Prior Publication Data

US 2024/0351780 A1 Oct. 24, 2024

(30) Foreign Application Priority Data

Apr. 20, 2023 (JP) ................................ 2023-069586

(51) Int. Cl.
*B65G 1/04* (2006.01)
*B65G 1/10* (2006.01)

(52) U.S. Cl.
CPC ............ *B65G 1/0407* (2013.01); *B65G 1/10* (2013.01)

(58) Field of Classification Search
CPC .. H10P 72/3404; H10P 72/34; H10P 72/3221; H10P 72/3218; H01L 21/67769; H01L 21/67763; H01L 21/67733; H01L 21/6773; B65G 1/10; B65G 1/0457; B65G 1/0435; B65G 1/0407
USPC .................................................... 414/331.14
See application file for complete search history.

(56) References Cited

U.S. PATENT DOCUMENTS 9,266,674 B2 * 2/2016 Reimer .................. B65G 1/026
2004/0191046 A1 9/2004 Mitsuyoshi
2005/0139564 A1 * 6/2005 Nakao .................. B65G 1/0457 212/71
2012/0114453 A1 * 5/2012 Ota ..................... H10P 72/3221 414/281
2014/0003902 A1 * 1/2014 Inui ........................ B65G 49/00 414/749.1
2016/0272422 A1 * 9/2016 Yoo ..................... H10P 72/3221
2016/0379858 A1 * 12/2016 Nogami .............. H10P 72/0608 414/217.1
2021/0398835 A1 12/2021 Torazawa et al.
2022/0194701 A1 6/2022 Takahara et al.
2022/0267093 A1 8/2022 Takahara et al.

FOREIGN PATENT DOCUMENTS

JP 2000-7112 A 1/2000
JP 2004-296996 A 10/2004
JP 2010-52920 A 3/2010
JP 2022-96668 A 6/2022
JP 2022-126900 A 8/2022
WO 2015/141793 A1 9/2015
WO WO-2020/095570 A1 5/2020

* cited by examiner

*Primary Examiner* — Glenn F Myers
(74) *Attorney, Agent, or Firm* — Harness, Dickey & Pierce, P.L.C.

(57) ABSTRACT

Achieved is a ceiling storage rack that can accommodate a plurality of objects. A ceiling storage rack that stores an object and is suspended from a ceiling includes a plurality of shelves that are able to be raised and lowered and a raising and lowering section that raises and lowers the plurality of shelves, vertically adjacent ones of the plurality of shelves being able to come closer to each other so that a distance therebetween is smaller than a height of the object.

8 Claims, 5 Drawing Sheets

CEILING STORAGE RACK AND CONVEYANCE SYSTEM

This Nonprovisional application claims priority under 35 U.S.C. § 119 on Patent Application No. 2023-069586 filed in Japan on Apr. 20, 2023, the entire contents of which are hereby incorporated by reference.

TECHNICAL FIELD

The present invention relates to a ceiling storage rack.

BACKGROUND ART

In a factory and the like in which semiconductor products are manufactured, for example, ceiling carriers have been conventionally used which convey objects along rails provided to ceilings. In such a factory, a ceiling storage rack may be provided along the rail in order to temporarily store an object being conveyed by the ceiling carrier. Patent Literature 1 discloses a ceiling carrier that can place an object on ceiling storage racks each including two shelves.

CITATION LIST

Patent Literature

Patent Literature 1

Publication of International Publication No. WO 2020/095570

SUMMARY OF INVENTION

Technical Problem

However, in some cases, having two shelves is an insufficient accommodation capacity for a ceiling storage rack. In other cases, due to lack of space, a plurality of ceiling storage racks cannot be provided along a rail. Therefore, there are demands for a ceiling storage rack which can accommodate more objects in a limited floor area.

It is an object of an aspect of the present invention to achieve a ceiling storage rack that can accommodate a plurality of objects.

Solution to Problem

In order to solve the foregoing problem, a ceiling storage rack in accordance with an aspect of the present invention is a ceiling storage rack that stores a predetermined object and that is suspended from a ceiling, the ceiling storage rack including: a plurality of shelves that are able to be raised and lowered; and a raising and lowering section that raises and lowers the plurality of shelves, vertically adjacent ones of the plurality of shelves being able to come closer to each other so that a distance therebetween is smaller than a height of the object.

Advantageous Effects of Invention

According to an aspect of the present invention, it is possible to achieve a ceiling storage rack that can accommodate a plurality of objects.

DESCRIPTION OF EMBODIMENTS

Embodiment 1

Figure 1:
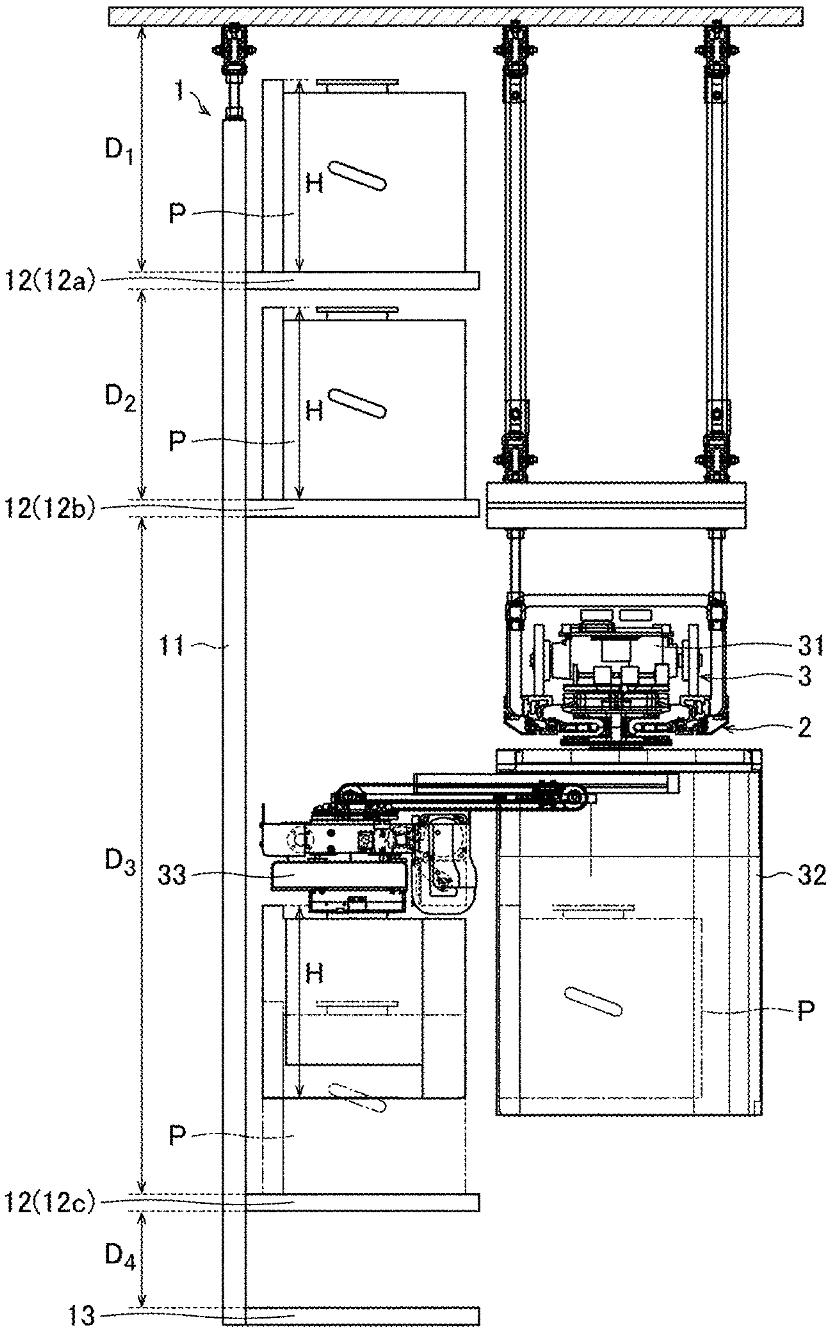
FIG. 1 is a front view illustrating a configuration of a ceiling storage rack in accordance with Embodiment 1 and a configuration of a conveyance system using the ceiling storage rack.

The following description will discuss an embodiment in accordance with an aspect of the present invention (hereinafter, also referred to as "present embodiment") with reference to the drawings. In the drawings, the same or corresponding portions are denoted by the same reference numerals, and descriptions thereof will not be repeated.

(Outline of Conveyance System 100)

FIG. 1 is a front view illustrating a configuration of a ceiling storage rack 1 in accordance with Embodiment 1 and a configuration of a conveyance system 100 using the ceiling storage rack 1. The conveyance system 100 includes a conveyance rail 2 that is suspended from a ceiling, a conveyance carriage 3 that travels on the conveyance rail 2, and the ceiling storage rack 1 that is provided adjacent to the conveyance rail 2. A plurality of conveyance carriages 3 may be provided.

The conveyance carriage 3 includes a traveling section 31, a carriage section 32, and a transfer section 33. The traveling section 31 is a section that travels on the conveyance rail 2. The carriage section 32 is a carriage suspended from the traveling section 31 and accommodates an object P. The transfer section 33 is a mechanism that transfers the object P accommodated in the carriage section 32, laterally with respect to the conveyance carriage 3. The transfer section 33 includes a mechanism that slides the object P laterally with respect to the conveyance carriage 3 and a mechanism that places or takes out the object P.

Therefore, the conveyance system 100 can transfer the object P from the conveyance carriage 3 to the ceiling storage rack 1 with use of the transfer section 33. Examples of the object P include a wafer accommodation container and a reticle accommodation container.

(Overview of Ceiling Storage Rack 1)

Figure 2:
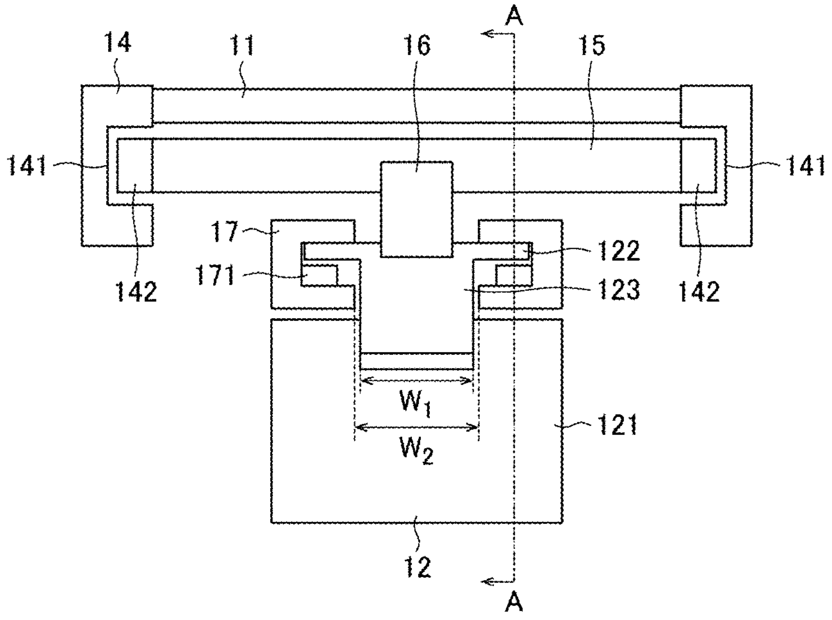
FIG. 2 is a top view showing that a shelf of the ceiling storage rack in accordance with Embodiment 1 is being raised and lowered.
Figure 3:
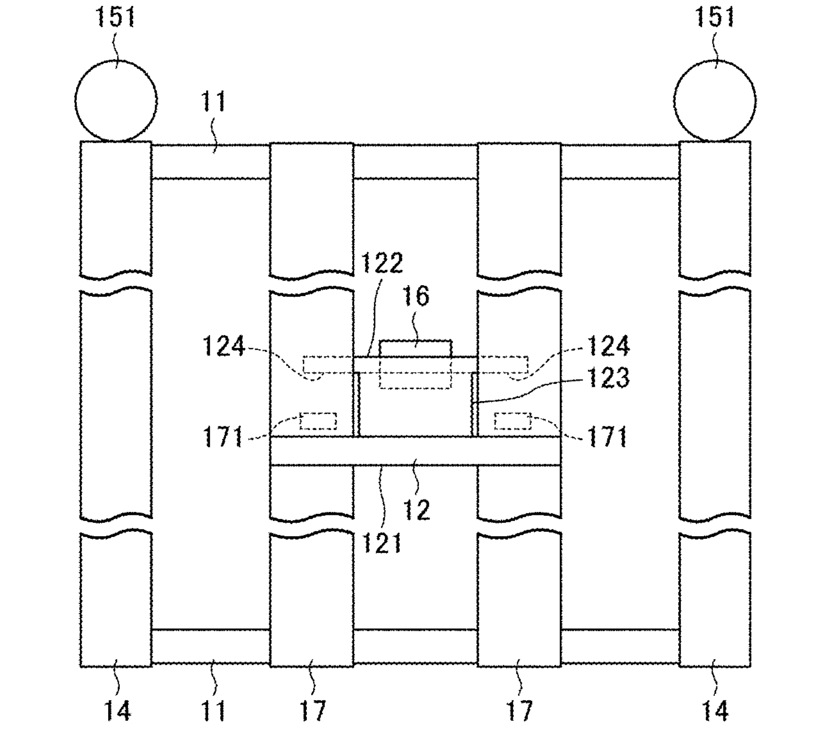
FIG. 3 is a front view showing that the shelf of the ceiling storage rack in accordance with Embodiment 1 is being raised and lowered.
Figure 4:
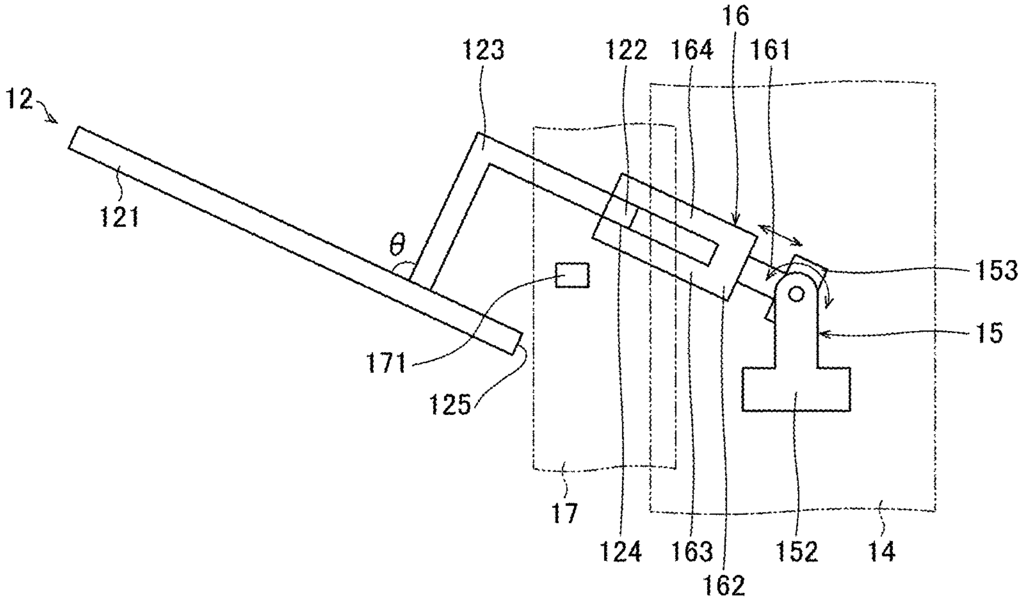
FIG. 4 is a cross-sectional view taken along a line A-A in FIG. 2 showing that the shelf of the ceiling storage rack in accordance with Embodiment 1 is being raised and lowered.
Figure 5:
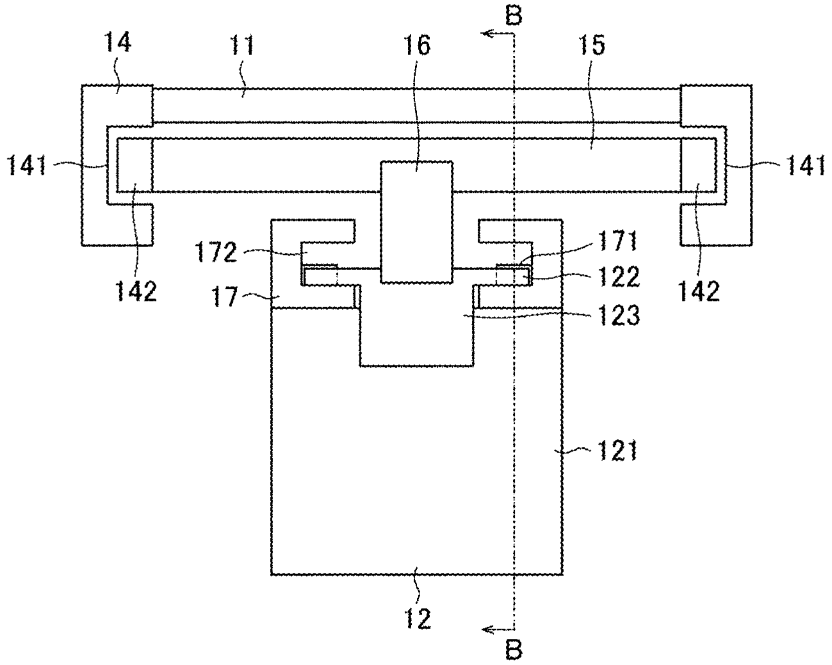
FIG. 5 is a top view showing that the shelf of the ceiling storage rack in accordance with Embodiment 1 is engaged with engagement sections.
Figure 6:
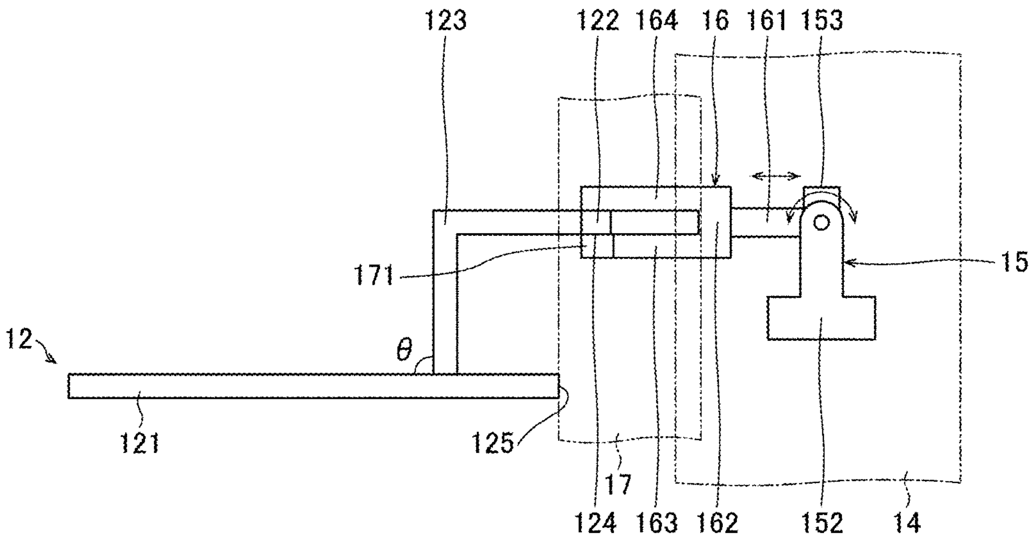
FIG. 6 is a cross-sectional view taken along a line B-B in FIG. 5 showing that the shelf of the ceiling storage rack in accordance with Embodiment 1 is engaged with the engagement sections.

FIG. 2 is a top view showing that a shelf 12 of the ceiling storage rack 1 in accordance with Embodiment 1 is being raised and lowered. FIG. 3 is a front view showing that the shelf 12 of the ceiling storage rack 1 in accordance with Embodiment 1 is being raised and lowered. FIG. 4 is a cross-sectional view taken along the line A-A in FIG. 2 showing that the shelf 12 of the ceiling storage rack 1 in accordance with Embodiment 1 is being raised and lowered. FIG. 5 is a top view showing that the shelf 12 of the ceiling storage rack 1 in accordance with Embodiment 1 is engaged d with engagement sections 17. FIG. 6 is a cross-sectional view taken along the line B-B in FIG. 5 showing that the shelf 12 of the ceiling storage rack 1 in accordance with Embodiment 1 is engaged with the engagement sections 17. The ceiling storage rack 1 includes a structure section 11, a plurality of shelves 12, a single shelf 13, linear guides 14, a raising and lowering section 15, a gripping section 16, and engagement sections 17.

The structure section 11 is a section serving as a framework of the entire ceiling storage rack 1 and is suspended from a ceiling. The shelves 12 are provided so as to be able to be raised and lowered with respect to the structure section 11. In contrast, the shelf 13 is fixed to the structure section 11.

In the present embodiment, the ceiling storage rack 1 has three shelves 12 which can be raised and lowered and has, at the lowest portion of the ceiling storage rack 1, the fixed shelf 13. The shelves 12 will also be referred to as, in order from the top, "shelf 12*a*", "shelf 12*b*", and "shelf 12*c*". A distance from the ceiling to the shelf 12*a*, a distance from the shelf 12*a* to the shelf 12*b*, a distance from the shelf 12*b* to the shelf 12*c*, and a distance from the shelf 12*c* to the shelf 13 are referred to as D1, D2, D3, and D4, respectively. In addition, the object P to be accommodated on the shelf 12 or the shelf 13 has a height H.

The shelves 12 each include a shelf part 121, a gripping target part 122, and a connection part 123. The shelf part 121 is a shelf on which the object P is to be placed. The shelf part 121 may have a shape that matches the object P as appropriate. The gripping target part 122 is a part spaced from the shelf part 121 and is to be gripped by the gripping section 16 described later. The connection part 123 is a part connecting the shelf part 121 and the gripping target part 122 and is bent to have an L shape. The bottom surfaces of both ends of the gripping target part 122 are provided with engagement parts 124. The engagement parts 124 are parts that abut on and are engaged with engagement members 171 described later.

The connection part 123 has a width W1 in a horizontal direction as seen from front. The width W1 of the connection part 123 is smaller than that of the shelf part 121 and than that of the gripping target part 122 and is smaller than a distance between the two engagement sections 17 described later. That is, the connection part 123 is formed so as to protrude.

The shelf part 121 is fixed to the connection part 123 at an angle θ (θ≤90°). The angle θ is an angle between the shelf part 121 and the connection part 123. When the angle θ is equal to or smaller than 90°, it is possible to prevent the object P placed on the shelf part 121 from dropping. In addition, the angle θ may be set in view of deformation of the shelf part 121 caused by the fact that the shelf part 121 has a cantilever structure and in view of inclination of the shelf part 121 caused by structural looseness. That is, the angle θ can be set so that, in a case where the shelf part 121 is deformed and/or in a case where the shelf part 121 inclines due to the looseness, the shelf part 121 becomes horizontal.

The linear guides 14 have fixing parts (linear guide rails) 141 fixed to the structure section 11. The shelves 12 are supported by the fixing parts 141 and are raised and lowered in a vertical direction. Note that each of the linear guides 14 is not limited to a linear guide and may be any linear motion support mechanism, such as a linear bush and a slide rail.

The raising and lowering section 15 is fixed to movable parts (linear guide blocks) 142 of the linear guides 14. The raising and lowering section 15 can be raised and lowered (i.e., is movable) with respect to the structure section 11 and can raise and lower the shelf 12 gripped by the gripping section 16 described later. The fixing parts 141 of the linear guides 14 each have an end part to which a driving part 151 is fixed. The driving parts 151 are motors that wind belts each having one end fixed to each of the driving parts 151 and the other end fixed to the raising and lowering section 15. Therefore, the driving parts 151 can raise and lower the raising and lowering section 15 by winding the belts around drums of the driving parts 151. In addition, the raising and lowering section 15 can raise and lower the shelf 12 gripped by the gripping section 16, independently of the other shelves 12.

The gripping section 16 is a gripping mechanism fixed to the raising and lowering section 15. That is, the raising and lowering section 15 is a gripping mechanism that is raised and lowered. The gripping section 16 includes a lower gripping part 163 that supports the shelf 12 and an upper gripping part 164 that presses the shelf 12 against the lower gripping part 163 so as to hold the shelf 12. The lower gripping part 163 and the upper gripping part 164 will also be collectively referred to as a "gripping mechanism".

The lower gripping part 163 and the upper gripping part 164 are connected to a base 162. The upper gripping part 164 is a mechanism that is driven upward and downward with respect to the base 162 and that grips the gripping target part 122. The upper gripping part 164 includes, for example, a cylinder. The gripping section 16 has a movement mechanism 161 between the base 162 and the raising and lowering section 15. The movement mechanism 161 is a mechanism that can slide the gripping mechanism forward and backward and is, for example, a cylinder. That is, the length of the movement mechanism 161 is changed so as to move a position of the gripping mechanism forward and backward. Accordingly, a position of the shelf 12 gripped by the gripping section 16 is moved forward and backward.

Note that the raising and lowering section 15 may be constituted by a raising and lowering base 152 and a raising and lowering rotation part 153. The raising and lowering rotation part 153 is a mechanism that is driven to rotate about the raising and lowering base 152. Examples of the raising and lowering rotation part 153 include a rotary cylinder. That is, the gripping section 16 and the shelf 12 can rotate with use of the raising and lowering rotation part 153. Note that the raising and lowering rotation part 153 rotates at a predetermined angle.

The engagement sections 17 are a pair of depressed members that are provided to the structure section 11 and that extend in a vertical direction. The pair of engagement sections 17 have respective depressed portions facing each other. Between the engagement sections 17, the gripping section 16 is located on a horizontal plane. A distance W2 between the engagement sections 17 is larger than the width W1 of the connection part 123. Therefore, the engagement sections 17 have a structure that does not interfere with the shelves 12. Further, in the depressed portions of the engagement sections 17, the gripping target part 122 is located.

The engagement sections 17 have engagement members 171 at a desired height. The engagement members 171 have structures protruding from the corresponding engagement sections 17. The engagement parts 124 abut on the engagement members 171 so as to be engaged with the engagement members 171. The engagement members 171 have a structure that can support a weight of the shelf 12 and a weight of the object P. Further, the engagement members 171 may have any mechanism that prevents the shelf 12 from inclining. Note that a plurality of desired heights at which the engagement members 171 of the engagement sections 17 are located may be set. That is, the gripping section 16 and the engagement sections 17 allow the shelf 12 gripped by the gripping section 16 to be set at a desired height in the engagement sections 17.

On a plane on which the engagement members 171 are present, there are gaps 172 in which the engagement members 171 are absent. Each of the gaps 172 is larger than the engagement part 124. Therefore, in a case where the gripping section 16 is raised and lowered, the engagement parts 124 pass through the gaps 172 so as to allow the shelves 12 to be raised and lowered without interfering with the engagement sections 17.

The shelf part 121 has a portion 125 protruding from the connection part 123 toward the engagement sections 17. While the shelf 12 is being engaged, the protruding portion 125 always abuts on the engagement sections 17, as described next.

(Raising and Lowering of Shelf 12)

The following description will discuss a case where the shelf 12 is raised and lowered, as illustrated in FIGS. 2 and 4. First, the raising and lowering rotation part 153 rotates, and the shelf 12 inclines. Next, the movement mechanism 161 is shortened so as to draw the shelf 12 in.

The rotation of the shelf 12 makes a state in which no components of the shelf 12 overlap the engagement members 171 in the vertical direction. That is, the portions of the connection part 123 which are to interfere with the engagement members 171 when the shelf 12 is raised and lowered are cut out. This allows the shelves 12 to be raised and lowered.

The engagement parts 124 are located in the gaps 172 (see FIG. 5). The engagement members 171 are absent in the gaps 172 and thus do not hinder the shelf 12 from being raised and lowered. That is, in a case where the engagement parts 124 are located in the gaps 172, the shelf 12 can be raised and lowered.

(Engagement of Shelf 12)

In contrast, in a case where, as illustrated in FIGS. 5 and 6, the shelf 12 is engaged with the engagement sections 17, the engagement parts 124 overlap the engagement members 171. Thus, the shelf 12 can abut on and be engaged with the engagement sections 17. That is, the shelf 12 is set at a desired height.

In this case, the movement mechanism 161 is first lengthened. Next, the raising and lowering rotation part 153 causes the shelf 12 to rotate and be horizontal. At this time, the protruding portion 125 abuts on the engagement sections 17. This causes the shelf 12 to exert, with use of the protruding portion 125, a force for holding a load of the object P. Therefore, it is possible to stably store an object accommodated.

In order to cause the shelf 12 to transition to the engaged state from a state in which the shelf 12 can be raised and lowered, the gripping section 16 uses of the movement mechanism 161 to move the lower gripping part 163 and the upper gripping part 164 which are gripping the gripping target part 122, toward the engagement members 171, and then raises the upper gripping part 164 so as to release the gripping. As a result, the shelf 12 can enter the engaged state.

In contrast, in order to cause the shelf 12 to transition, from the engaged state, to the state in which the shelf 12 can be raised and lowered, the gripping section 16 uses of the movement mechanism 161 to move the lower gripping part 163 and the upper gripping part 164 to positions at which the gripping section 16 can grip the gripping target part 122. Next, the gripping section 16 lowers the upper gripping part 164 so as to grip the gripping target part 122 and uses the movement mechanism 161 to recede to an extent that the positions of the engagement parts 124 correspond to the positions of the gaps 172. This causes the shelf 12 to enter the state in which the shelf 12 can be raised and lowered.

(Operation Process)

Next, the following description will discuss an operation process of the ceiling storage rack 1. The following description starts from a state in which no object P is placed on the ceiling storage rack 1.

Figure 7:
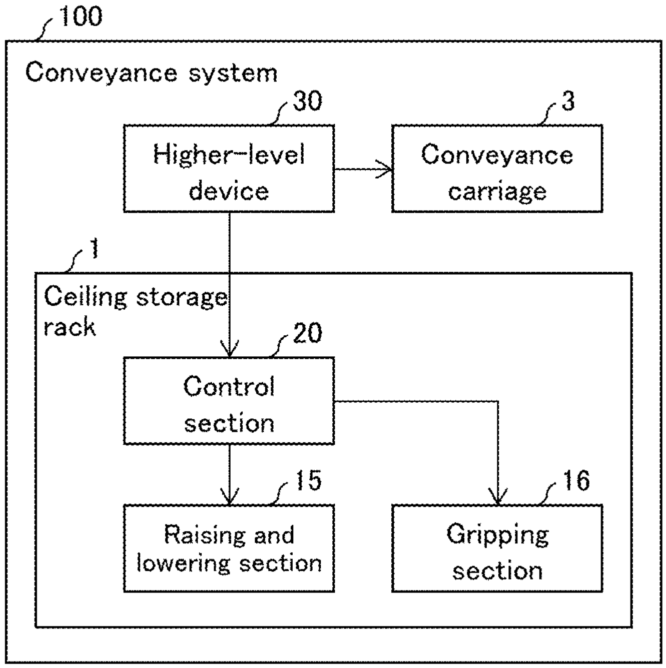
FIG. 7 is a block diagram illustrating a configuration of a main part of the conveyance system.

FIG. 7 is a block diagram illustrating a configuration of a main part of the conveyance system 100. The ceiling storage rack 1 further includes a control section 20. The control section 20 performs overall control of the components of the ceiling storage rack 1. The control section 20 controls the positions of the shelves 12 of the ceiling storage rack 1 in accordance with instructions from an external higher-level device 30. That is, the control section 20 receives, from the higher-level device 30, an instruction as to which one of the shelves 12 and the shelf 13 an object P on the conveyance carriage 3 is to be placed on or an instruction as to which one of the shelves 12 and the shelf 13 an object P is taken out from. The control section 20 then operates in accordance with the instruction. The higher-level device 30 controls also the conveyance carriage 3.

In a case where an object P is placed on the shelf 12*a*, the control section 20 lowers the shelf 12*a*, the shelf 12*b*, and the shelf 12*c*, particularly to desired heights such that the object P can be placed on the shelf 12*a*. That is, the control section 20 causes the shelf 12*a*, the shelf 12*b*, the shelf 12*c*, and the shelf 13 to come closer to each other so that each of the distance D2, the distance D3, and the distance D4 is smaller than the height H of the object P. After the transfer section 33 has placed the object P on the shelf 12*a*, the control section 20 raises the shelf 12*a*. It is only necessary that the shelf 12*a* be raised to a position such that an object P can be placed on the shelf 12*b* directly below the shelf 12*a* (i.e., the shelf 12*a* need only be located at a height at which the distance D2 is larger than the height H and the shelf 12*a* does not interfere with the transfer section 33). For example, the shelf 12*a* may be raised to the maximum possible height at which the object P is not brought into contact with the ceiling. That is, the control section 20 causes the distance D1 to be slightly larger than the height H of the object P.

Next, in a case where an object P is placed on the shelf 12*b*, the control section 20 raises and lowers the shelf 12*b* and the shelf 12*c* to desired heights such that the object P can be placed on the shelf 12*b*. That is, the control section 20 causes the shelf 12*b*, the shelf 12*c*, and the shelf 13 to come closer to each other so that each of the distance D3 and the distance D4 is smaller than the height H of the object P. After the transfer section 33 has placed the object P on the shelf 12*b*, the control section 20 raises the shelf 12*b*. It is only necessary that the shelf 12*b* be raised to a position such that an object P can be placed on the shelf 12*c* directly below the shelf 12 *b* (i.e., the shelf 12*b* need only be located at a height at which the distance D3 is larger than the height H and the shelf 12*b* does not interfere with the transfer section 33). For example, the shelf 12*b* may be raised to the maximum possible height at which the object P is not brought into contact with the shelf 12*a*. That is, the control section 20 causes the distance D2 to be slightly larger than the height H of the object P.

Next, in a case where an object P is placed on the shelf 12*c*, the control section 20 raises and lowers the shelf 12*c* to a desired height such that the object P can be placed on the shelf 12*c*. That is, the control section 20 causes the shelf 12*c* and the shelf 13 to come closer to each other so that the distance D4 is smaller than the height H of the object P. After the transfer section 33 has placed the object P on the shelf 12*c*, the control section 20 raises the shelf 12*c*. It is only necessary that the shelf 12*c* be raised to a position such that an object P can be placed on the shelf 13 directly below the shelf 12*c* (i.e., the shelf 12*c* need only be located at a height at which the distance D4 is larger than the height H and the shelf 12*c* does not interfere with the transfer section 33). For example, the shelf 12*c* may be raised to the maximum possible height at which the object P is not brought into contact with the shelf 12*b*. That is, the control section 20 causes the distance D3 to be slightly larger than the height H of the object P.

Next, in a case where an object P is placed on the shelf 13, the transfer section 33 places the object P on the shelf 13. Thus, on all the shelves 12 and 13 of the ceiling storage rack 1, the objects P are placed.

The above description discusses a case where the objects P are accommodated in the ceiling storage rack 1. The following description will discuss a case where the objects P are taken out from the ceiling storage rack 1. First, the control section 20 raises the shelf 12*c* to a position at which the shelf 12*c* and the transfer section 33 do not interfere with each other. That is, the control section 20 causes the distance D4 to be larger so as to prevent the transfer section 33 from interfering with the shelf 12*c*. Note that the control section 20 also raises the shelves 12*a* and 12*b* to positions at which the shelf 12*a* and the shelf 12*b* do not interfere with the object P on the shelf 12*b* and the object P on the shelf 12*c*, respectively. The transfer section 33 then takes out the object P placed on the shelf 13.

Next, in a case where the object P placed on the shelf 12*c* is to be taken out, the control section 20 lowers the shelf 12*c* to a desired height at which the object P can be picked up. That is, the control section 20 causes the distance D4 to be smaller than the height H of the object P. After the transfer section 33 has transferred the object P placed on the shelf 12*c*, the control section 20 may further lower the shelf 12*c* to a position at which the shelf 12*c* does not interfere with the shelf 13.

Next, in a case where the object P placed on the shelf 12*b* is to be taken out, the control section 20 lowers the shelf 12*b* to a desired height at which the object P can be picked up. That is, the control section 20 causes the distance D3 to be smaller than the height H of the object P. After the transfer section 33 has transferred the object P placed on the shelf 12*b*, the control section 20 may further lower the shelf 12*b* to a position at which the shelf 12*b* does not interfere with the shelf 12*c*.

Next, in a case where the object P placed on the shelf 12*a* is to be taken out, the control section 20 lowers the shelf 12*a* to a desired height at which the object P can be picked up. That is, the control section 20 causes the distance D2 to be smaller than the height H of the object P. After the transfer section 33 has transferred the object P placed on the shelf 12*a*, the control section 20 may further lower the shelf 12*a* to a position at which the shelf 12*a* does not interfere with the shelf 12*b*.

Thus, the control section 20 causes the shelves to come closer to each other so that a distance between the vertically adjacent shelves is smaller than the height H of the object P. After an object P has been placed on a shelf 12, the control section 20 raises and lowers the shelf 12 on which the object P is placed and causes the shelf 12 to be engaged with the engagement members 171. That is, after the object P has been placed on the shelf 12, the raising and lowering section 15 raises and lowers the shelf 12 on which the object P is placed and causes the shelf 12 to be engaged with the engagement members 171. As a result, it is possible to engage the shelf 12 with the engagement members 171.

After an object P has been placed on a shelf 12, the control section 20 raises and lowers the shelf 12 to a position at which an object P can be placed on the shelf directly below the shelf 12. That is, after the object P has been placed on the shelf 12, the raising and lowering section 15 is raised and lowered to a position at which an object P can be placed on the shelf directly below the shelf 12. In a case where the object P placed on the shelf 12 is to be taken out, the control section 20 raises and lowers the shelf 12 to a desired height at which the object P can be picked up. That is, in a case where the conveyance carriage 3 is to take out the object P placed on the shelf 12, the raising and lowering section 15 raises and lowers the shelf 12 to a desired position at which the conveyance carriage 3 can pick up the object P.

The plurality of shelves can be raised and lowered independently of each other. Further, the control section 20 raises the topmost shelf (shelf 12*a*) until the object P placed on the topmost shelf comes close to the ceiling.

Note that the engagement members 171 are provided at a desired height(s) such that an object P on each shelf 12 can be placed or picked up and at a desired height(s) such that the object P is to be stored in an upper area in the ceiling storage rack 1 after the object P has been accommodated. This eliminates the need for constantly holding each of the plurality of shelves 12 with use of the gripping section 16 and thus achieves energy-saving. In addition, the desired height at which the object P is to be placed and the desired height at which the object P is to be picked up may be identical.

(Effect)

As described above, the ceiling storage rack 1 can accommodate a plurality of objects P in a limited floor area. In addition, the ceiling storage rack 1 utilizes a space up to the vicinity of the ceiling and occupies, merely to a small extent, a space below the conveyance rail 2. This makes it possible to secure a sufficient space for equipment provided below the conveyance rail 2.

Further, a space below the ceiling storage rack 1 is typically occupied by equipment. Thus, it is difficult to cause the ceiling storage rack 1 to extend downward. In a case where a distance between the vertically adjacent shelves 12 cannot be smaller than the height of the object P, not many shelves 12 for accommodating the objects P can stand by, due to the limited space between the conveyance rail 2 and the equipment.

Here, in the present embodiment, the shelves 12 can be raised and lowered independently of each other and come closer to each other so that the distance between the vertically adjacent shelves 12 standing by is smaller than the height of the object P. This makes it possible to provide more shelves 12 between the ceiling and the equipment. Therefore, it is possible to accommodate more objects P in a small limited floor area.

Further, the topmost shelf (shelf 12*a*) can be raised to the vicinity of the ceiling, and thus it is possible to effectively utilize a conventionally unused space beside the conveyance rail 2.

Embodiment 2

The following description will discuss another embodiment of the present invention. For convenience of description, a member having a function identical to that of a member discussed in Embodiment 1 above is given an identical reference sign, and a description thereof is omitted.

(Overview of Conveyance System 101)

Figure 8:
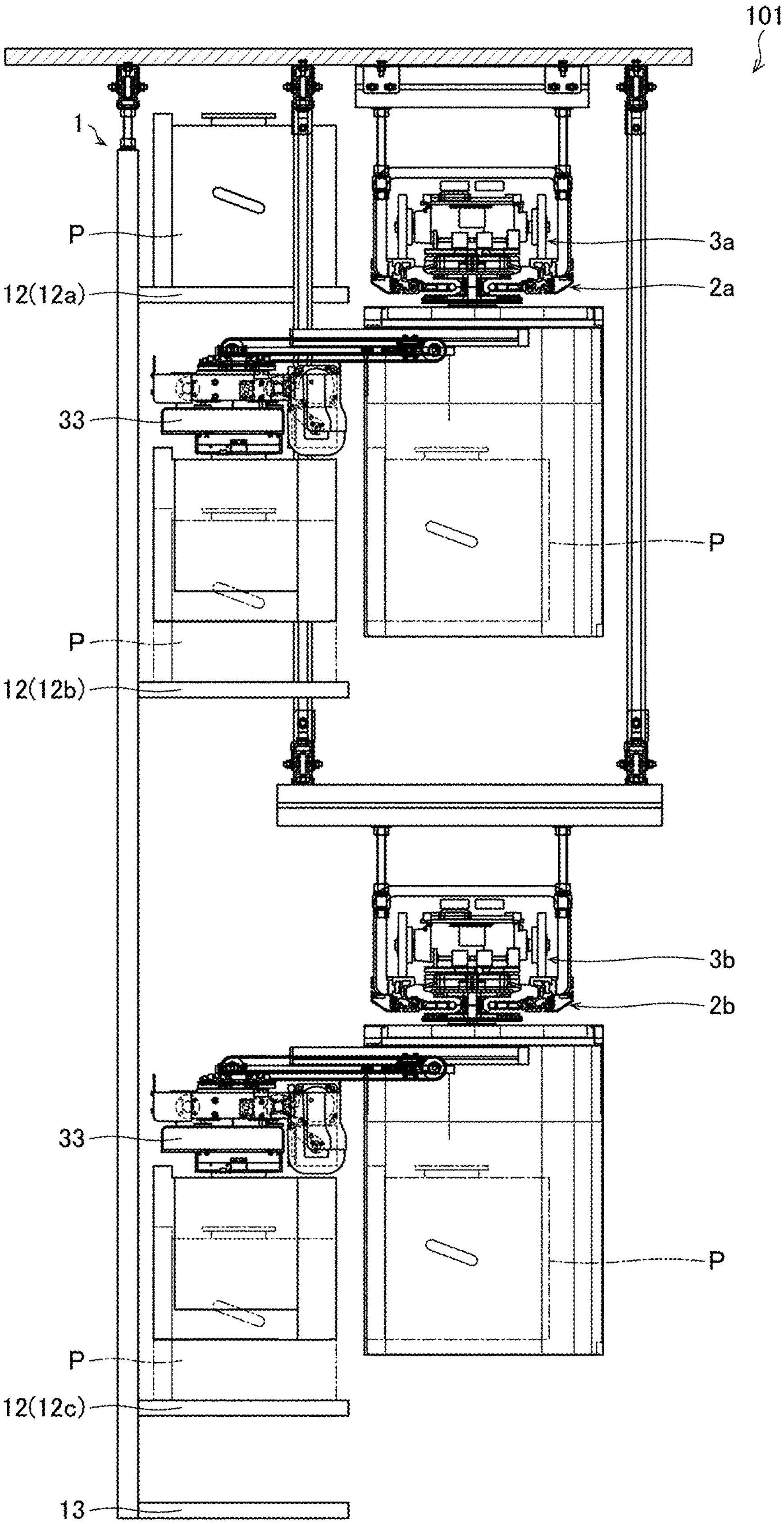
FIG. 8 is a front view illustrating a configuration of a ceiling storage rack in accordance with Embodiment 2 and a configuration of a conveyance system using the ceiling storage rack.

FIG. 8 is a front view illustrating a configuration of a ceiling storage rack 1 in accordance with Embodiment 2 and a configuration of a conveyance system 101 using the ceiling storage rack 1. The conveyance system 101 includes a first conveyance rail 2*a* and a second conveyance rail 2*b* that are suspended from the ceiling and that are provided at different heights, a first conveyance carriage 3*a* that travels on the first conveyance rail 2*a*, a second conveyance carriage 3*b* that travels on the second conveyance rail 2*b*, and a ceiling storage rack 1 that is provided adjacent to the first conveyance rail 2*a* and the second conveyance rail 2*b*. The ceiling storage rack 1 in Embodiment 2 is the same as that in Embodiment 1.

That is, in Embodiment 2, a plurality of combinations of the conveyance rails 2 and the conveyance carriages 3 in Embodiment 1 are provided adjacent to the ceiling storage rack 1 at different heights.

(Transferring of Object P in Height Direction)

Next, an operation process of the conveyance system 101 will be discussed. The following description starts from a state in which no object P is placed on the ceiling storage rack 1. The following description will discuss a case where the object P is transferred with use of the topmost shelf 12*a*, from the first conveyance carriage 3*a* that travels on the first conveyance rail 2*a*, to the second conveyance carriage 3*b* that travels on the second conveyance rail 2*b*. However, the present embodiment is not limited to this. Further, the number of the conveyance rails 2 is not limited. That is, it is only necessary that the object P be transferred between conveyance carriages 3 that travel at different heights.

The first conveyance carriage 3*a* accommodates an object P. The object P will be transferred to the ceiling storage rack 1 with use of the transfer section 33. The control section 20 raises the vacant shelf 12*a* from the first conveyance carriage 3*a* to a position at which the object P can be placed on the shelf 12*a*. The transfer section 33 of the first conveyance carriage 3*a* then transfers the object P to the shelf 12*a*.

Next, the control section 20 raises the shelf 12*a* to a desired height at which the second conveyance carriage 3*b* can pick up the object P. After that, the transfer section 33 of the second conveyance carriage 3*b* picks up the object P from the shelf 12*a*.

This makes it possible to transfer the object P between the first conveyance carriage 3*a* and the second conveyance carriage 3*b* that travel at different heights. Therefore, without a dedicated raising and lowering machine for the object P, it is possible to transfer an object between the first conveyance rail 2*a* and the second conveyance rail 2*b* that are provided at different heights. This improves a degree of design flexibility of an entire factory and makes an operation in the factory efficient.

[Variations]

(Raising and Lowering Section 15)

In Embodiments 1 and 2, the raising and lowering section 15 is raised and lowered by the mechanisms that wind up belts with use of drums. However, the raising and lowering section 15 is not limited to this. For example, the raising and lowering section 15 may be raised and lowered with use of a feed screw, such as a ball screw or may be raised and lowered with use of a timing belt. Alternatively, it is possible that the raising and lowering section 15 is provided with a motor including a pinion gear, and racks are provided instead of the linear guides 14. In this case, the raising and lowering section 15 is raised and lowered through meshing of the racks and the pinion. It is alternatively possible to employ any other raising and lowering system. Examples of such a system include a cylinder.

(Gripping Section 16)

In Embodiments 1 and 2, the gripping section 16 is a mechanism that grips the gripping target part 122 between the lower gripping part 163 and the upper gripping part 164. However, the gripping section 16 is not limited to this. For example, the gripping section 16 may thrust a fork of the gripping section 16 to below the shelf 12 and lift the shelf 12.

(Shelf 13)

In Embodiments 1 and 2, the shelf 13 is fixed to the structure section 11. However, the shelf is not limited to this. The shelf 13 may be also able to be raised and lowered.

(Shelf 12)

The number of the shelves 12 is not limited, provided that the number of the shelves 12 is more than one. Note that, a larger distance between the conveyance rail 2 and the ceiling allows more shelves to be provided.

(Raising and Lowering Sections 15)

The number of the raising and lowering section 15 is not limited to one. The raising and lowering section 15 may be provided for each of the shelves 12 and may be fixed to each of the shelves 12. In this case, the engagement members 171 may be not provided.

(Engagement Member 171 and Engagement Part 124)

It is possible that the engagement members 171 are provided with openings formed at top portions of the engagement members 171 and hollows formed inside the engagement members 171, so as to have pocket shapes, and the engagement parts 124 protrude downward from the gripping target part 122. In this case, the engagement parts 124 penetrate into the pockets of the engagement members 171, so that the shelf 12 is engaged with the engagement sections 17.

Note that, the engagement parts 124 may have a tapered shape such that tip portions of the engagement parts 124 are thinner than root portions of the engagement parts 124. In this case, the engagement parts 124 have the thinner tip portions and thus are easily inserted into the engagement members 171. In addition, the engagement parts 124 have the thicker root portions and thus makes the clearances with the engagement members 171 smaller and decreases the looseness. This tapered shape makes it unlikely for the shelves 12 to incline. Note that, in this case, the protruding portion 125 may be not provided.

Aspects of the present invention can also be expressed as follows:

In order to solve the foregoing problem, a ceiling storage rack in accordance with Aspect 1 of the present invention is a ceiling storage rack in a conveyance system including a conveyance rail and a conveyance carriage, the ceiling storage rack being configured to store a predetermined object and being suspended from a ceiling, the ceiling storage rack including: a plurality of shelves that are able to be raised and lowered; and a raising and lowering section that raises and lowers the plurality of shelves, vertically adjacent ones of the plurality of shelves being able to come closer to each other so that a distance therebetween is smaller than a height of the object.

According to the above configuration, it is possible to accommodate objects on the plurality of shelves and thus to accommodate more objects in a small floor area. In addition, a distance between the shelves is made smaller than the height of the object in a limited height between the conveyance carriage that transfers the object into and out of the ceiling storage rack and equipment that uses the object. This allows more shelves that are vacant to be provided.

A ceiling storage rack in accordance with Aspect 2 of the present invention may be configured, in Aspect 1, such that the raising and lowering section includes a gripping section that is configured to be raised and lowered, to grip the plurality of shelves, and to set each of the plurality of shelves at a desired height.

According to the above configuration, the need for providing a raising and lowering section for each of the shelves is eliminated, and it is only necessary that the shelf be temporarily gripped by the gripping section that is raised and lowered with use of the raising and lowering section. Therefore, setting the shelf at a desired height with use of the gripping section makes it possible to make a state in which the raising and lowering section and the gripping section consume no energy. This achieves energy-saving.

A ceiling storage rack in accordance with Aspect 3 of the present invention may be configured, in Aspect 2, to further include engagement members that are able to be engaged with the plurality of shelves at a plurality of heights differing from each other.

According to the above configuration, it is possible to engage the shelves with the engagement members with use of the gripping section. This eliminates the need for holding the shelves at desired heights and thus achieves energy-saving.

A ceiling storage rack in accordance with Aspect 4 of the present invention may be configured, in Aspect 3, such that, after the object has been placed on one of the plurality of shelves, the raising and lowering section raises and lowers the one of the plurality of shelves on which the object is placed, so as to engage the one of the plurality of shelves with the engagement members.

According to the above configuration, engaging shelves on which objects are placed with the engagement members eliminates the need for holding the shelves with use of the raising and lowering section. This achieves energy-saving.

A ceiling storage rack in accordance with Aspect 5 of the present invention may be configured, in Aspects 1 to 4, such that, after the object has been placed on one of the plurality of shelves, the raising and lowering section raises and lowers the one of the plurality of shelves to a position at which the object is able to be placed on another one of the plurality of shelves which is directly below the one of the plurality of shelves.

According to the above configuration, it is possible to continually place objects on the shelves with good efficiency.

A ceiling storage rack in accordance with Aspect 6 of the present invention may be configured, in Aspects 1 to 5, such that, in a case where the conveyance carriage is to take out the object placed on one of the plurality of shelves, the raising and lowering section raises and lowers the one of the plurality of shelves to a desired position at which the conveyance carriage is able to pick up the object.

According to the above configuration, it is possible to take out the objects stored from the ceiling storage rack.

A ceiling storage rack in accordance with Aspect 7 of the present invention may be configured, in Aspects 1 to 6, such that the plurality of shelves are able to be raised and lowered independently of each other.

According to the above configuration, it is possible to raise and lower the shelves independently of each other and thus to efficiently accommodate the objects.

A ceiling storage rack in accordance with Aspect 8 of the present invention may be configured, in Aspects 1 to 7, such that the topmost shelf of the plurality of shelves is able to be raised so that the object placed on the topmost shelf is moved to a vicinity of a ceiling.

According to the above configuration, it is possible to raise the topmost shelf to the vicinity of the ceiling and thus to make best use of a space in a vertical direction.

A ceiling storage rack in accordance with Aspect 9 of the present invention may be configured, in Aspects 1 to 8, such that the object is a wafer accommodation container or a reticle accommodation container.

According to the above configuration, the ceiling storage rack stores a wafer accommodation container or a reticle accommodation container, so that it is possible to accommodate a plurality of workpieces in the vicinities of devices and manage the plurality of workpieces. This makes it possible to efficiently manufacture semiconductors.

A conveyance system in accordance with Aspect 10 of the present invention includes: the ceiling storage rack in accordance with Aspects 1 to 9; a conveyance rail provided adjacent to the ceiling storage rack; and a conveyance carriage that travels on the conveyance rail and that places the object in the ceiling storage rack.

According to the above configuration, it is possible to use the ceiling storage rack as a part of the conveyance system. This makes it easy to manage objects in the conveyance system.

A conveyance system in accordance with Aspect 11 of the present invention may be configured, in Aspect 10, such that the conveyance rail includes a first conveyance rail and a second conveyance rail that are provided at a height different from a height at which the first carriage rail is provided, and the shelves each transfer the object between a first conveyance carriage that travels on the first conveyance rail and a second conveyance carriage that travels on the second conveyance rail.

According to the above configuration, it is possible to transfer, via the ceiling storage rack, the object between the two conveyance rails provided at different heights.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Ceiling storage rack
2 Conveyance rail
**2*a*** First conveyance rail
**2*b*** Second conveyance rail

3 Conveyance carriage
3*a* First conveyance carriage
3*b* Second conveyance carriage
11 Structure section
12, 12*a* to 12*c*, 13 Shelf
14 Linear guide
15 Raising and lowering section
16 Gripping section
17 Engagement section
20 Control section
30 Higher-level device
100, 101 Conveyance system
121 Shelf part
122 Gripping target part
123 Connection part
124 Engagement part
151 Driving part
152 Raising and lowering base
153 Raising and lowering rotation part
161 Movement mechanism
162 Base
163 Lower gripping part
164 Upper gripping part
171 Engagement member
172 Gap
P Object.

The invention claimed is:

1. A ceiling storage rack in a conveyance system including a conveyance rail and a conveyance carriage that comprises a transfer section, the ceiling storage rack being configured to store a predetermined object and being suspended from a ceiling, the ceiling storage rack comprising:

a plurality of shelves that are able to be raised and lowered; and a raising and lowering section that raises and lowers the plurality of shelves, wherein the raising and lowering section is configured to, after the transfer section removes the predetermined object from a selected one of the plurality of shelves, lower the selected shelf so that a distance between the selected shelf and a vertically adjacent shelf is smaller than a height of the predetermined object.

2. The ceiling storage rack according to claim 1, wherein the raising and lowering section includes a gripping section that is configured to be raised and lowered, to grip the plurality of shelves, and to set each of the plurality of shelves at a desired height.

3. The ceiling storage rack according to claim 2, further comprising engagement members that are able to be engaged with the plurality of shelves at a plurality of heights differing from each other.

4. The ceiling storage rack according to claim 3, wherein, after the object has been placed on one of the plurality of shelves, the raising and lowering section raises and lowers the one of the plurality of shelves on which the object is placed, so as to engage the one of the plurality of shelves with the engagement members.

5. The ceiling storage rack according to claim 1, wherein, after the object has been placed on one of the plurality of shelves, the raising and lowering section raises and lowers the one of the plurality of shelves to a position at which the object is able to be placed on another one of the plurality of shelves which is directly below the one of the plurality of shelves.

6. The ceiling storage rack according to claim 1, wherein, in a case where the conveyance carriage is to take out the object placed on one of the plurality of shelves, the raising and lowering section raises and lowers the one of the plurality of shelves to a desired position at which the conveyance carriage is able to pick up the object.

7. The ceiling storage rack according to claim 1, wherein the plurality of shelves are able to be raised and lowered independently of each other.

8. A conveyance system comprising:

the ceiling storage rack according to claim 1;

a conveyance rail provided adjacent to the ceiling storage rack; and a conveyance carriage that travels on the conveyance rail and that places the object in the ceiling storage rack.

* * * * *